J. E. Simpson,
Floating Dock.
Nº 17,396.  Patented May 26, 1857.
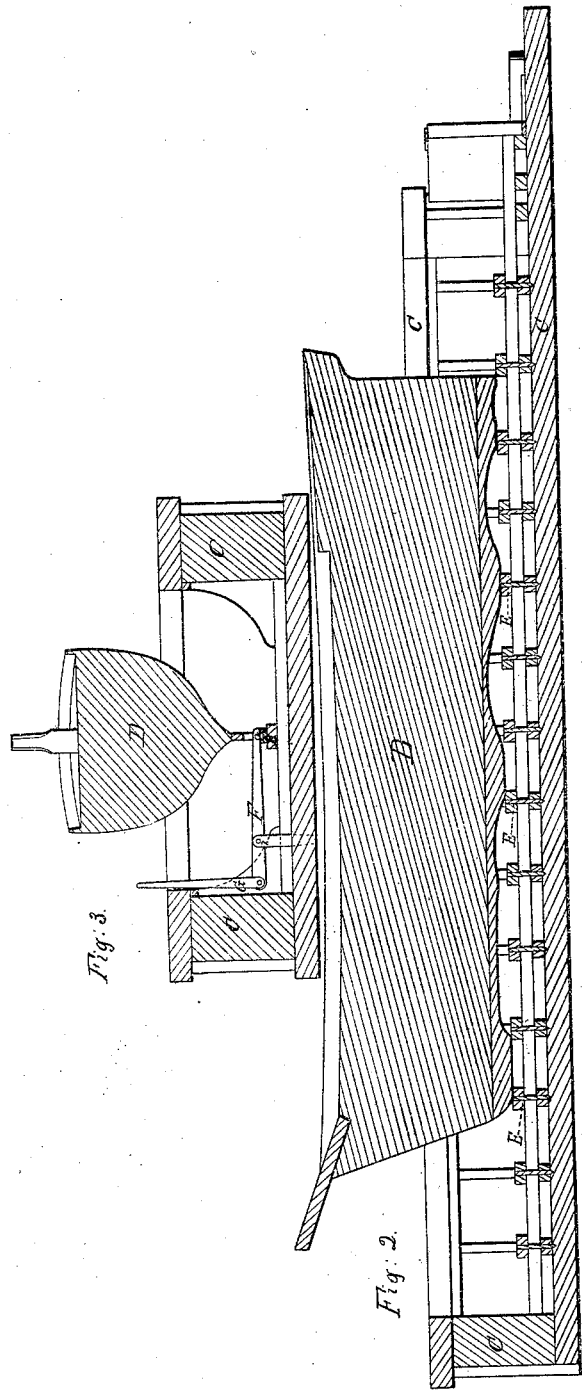
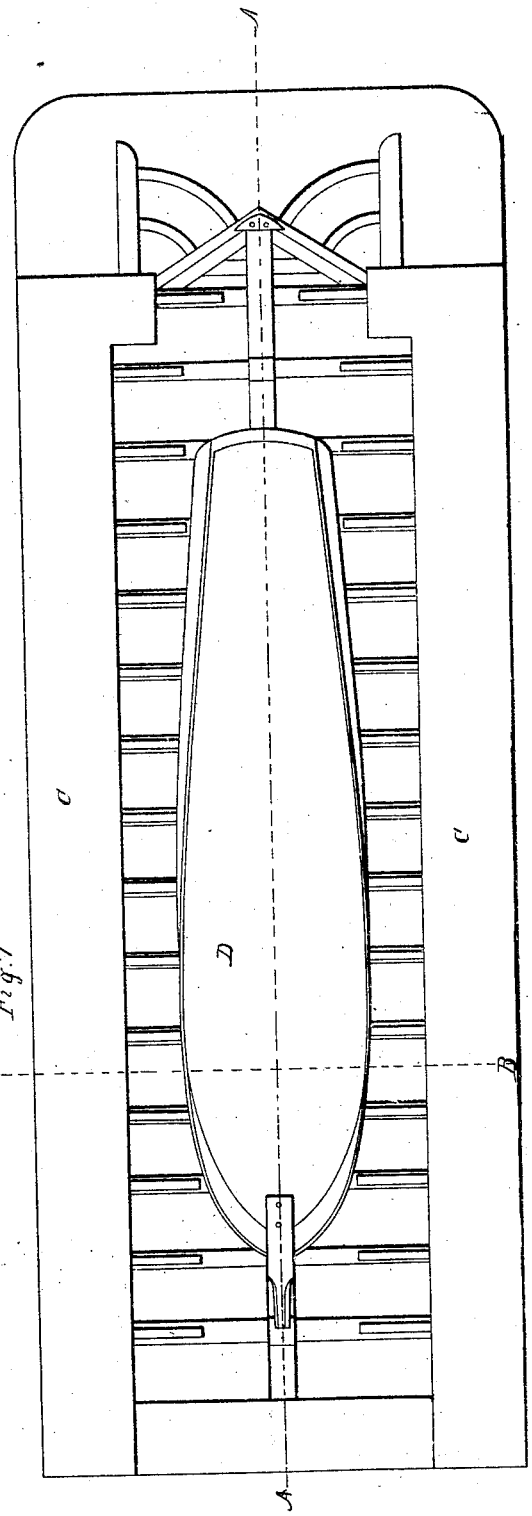

UNITED STATES PATENT OFFICE.

JAMES E. SIMPSON, OF EAST BOSTON, MASSACHUSETTS.

APPARATUS FOR EXAMINING VESSELS' KEELS.

Specification of Letters Patent No. 17,396, dated May 26, 1857.

*To all whom it may concern:*

Be it known that I, JAMES E. SIMPSON, of East Boston, in the county of Suffolk and State of Massachusetts, have invented a new and useful Apparatus for the Purpose of Examining the Keels of Vessels Before the Water is Pumped from the Dock; and I hereby declare the following to be a full, clear, and exact description of my invention and of the manner in which I have carried it out, reference being had to the accompanying drawings, making part of this specification, in which—

Figure 1, is a plan. Fig. 2 a section upon the line A A, and Fig. 3, a section upon the line B, B, of Fig. 1.

When vessels are presented for repairs at the dry dock there is no accurate and reliable method by which the condition of the keel may be readily tested before the vessel is docked and the water is pumped out, and consequently where the keel is crooked or the shoe torn off in places, the vessel is liable to be strained as she settles upon the blocking, and it is very important to have a method of testing the condition of the keel before the water is pumped out of the dock.

By the use of my present invention a knowledge of the condition of the keel at every point may be easily acquired before pumping out the dock.

In the accompanying drawings C, is the dry dock, D, the hull of a vessel having its keel damaged and partially torn away, E, is the ordinary stationary blocking, F, are levers pivoted at $i$, the ends of which project beneath the keel of the vessel, as at $a$. To the other ends of these levers are hinged the upright rods G, which rise on one side of the dock as seen in Fig. 3. When the vessel is in place, and before the water is pumped out, the rods G, are depressed until the ends $a$, of the levers F, strike against the keel. The rods G, may be graduated or not as may be found desirable; where a series of these levers and rods are employed along the whole length of the dock at distances of ten feet more or less from each other, the exact condition and contour of the sole of the keel may be instantly known without the necessity of pumping out the water for the purpose.

The examining levers F, are described as placed along the whole length of the dock;
instead of this arrangement, however, a single one may be placed at the entrance, or even outside the dock, and as the vessel passes over it the condition of its keel may be ascertained at every point.

What I claim as my invention and desire to secure by Letters Patent, is—

The within described apparatus for examining keels of vessels, consisting essentially of the levers F, and rods G, arranged and operating in the manner substantially as herein set forth.

JAMES E. SIMPSON.

Witnesses:
P. E. TESCHEMACHER,
THOS. R. ROACH.